(12) United States Patent
Brutinel

(10) Patent No.: US 12,540,347 B2
(45) Date of Patent: Feb. 3, 2026

(54) METHOD TO DETECT AND ENUMERATE MICROORGANISMS

(71) Applicant: 3M INNOVATIVE PROPERTIES COMPANY, St. Paul, MN (US)

(72) Inventor: Evan D. Brutinel, Inver Grove Heights, MN (US)

(73) Assignee: NEOGEN FOOD SAGETY US HOLDCO CORPORATION, Lansing, MI (US)

( * ) Notice: Subject to any disclaimer, the term of this patent is extended or adjusted under 35 U.S.C. 154(b) by 1078 days.

(21) Appl. No.: 17/439,924

(22) PCT Filed: Apr. 2, 2020

(86) PCT No.: PCT/IB2020/053156
§ 371 (c)(1),
(2) Date: Sep. 16, 2021

(87) PCT Pub. No.: WO2020/202070
PCT Pub. Date: Oct. 8, 2020

(65) Prior Publication Data
US 2022/0177944 A1    Jun. 9, 2022

Related U.S. Application Data

(60) Provisional application No. 62/830,058, filed on Apr. 5, 2019.

(51) Int. Cl.
| | |
|---|---|
| *C12Q 1/04* | (2006.01) |
| *C09K 8/66* | (2006.01) |
| *C12M 1/00* | (2006.01) |
| *C12M 1/12* | (2006.01) |
| *C12M 1/30* | (2006.01) |
| *C12M 1/34* | (2006.01) |
| *C12Q 1/06* | (2006.01) |

(52) U.S. Cl.
CPC .................. *C12Q 1/04* (2013.01); *C09K 8/66* (2013.01); *C12M 23/04* (2013.01); *C12M 23/20* (2013.01); *C12M 25/06* (2013.01); *C12M 33/02* (2013.01); *C12M 41/36* (2013.01); *C12Q 1/06* (2013.01)

(58) Field of Classification Search
None
See application file for complete search history.

(56) References Cited

U.S. PATENT DOCUMENTS

| 4,565,783 | A | 1/1986 | Hansen | |
|---|---|---|---|---|
| 5,089,413 | A | 2/1992 | Nelson | |
| 2001/0041352 | A1* | 11/2001 | Reilly | C12Q 1/04 435/30 |
| 2002/0192742 | A1* | 12/2002 | Ushiyama | C12M 1/16 435/243 |
| 2011/0244511 | A1* | 10/2011 | Mach | C12Q 1/04 435/39 |
| 2013/0089923 | A1* | 4/2013 | Moeller | B01L 9/52 435/289.1 |
| 2015/0010941 | A1* | 1/2015 | Young | C12M 23/04 435/288.7 |
| 2016/0075988 | A1* | 3/2016 | Halverson | C12M 23/24 435/39 |
| 2017/0233691 | A1 | 8/2017 | Brutinel | |
| 2017/0355943 | A1 | 12/2017 | Brutinel | |
| 2019/0023975 | A1 | 1/2019 | Shim | |
| 2020/0399574 | A1* | 12/2020 | Bjork | C12M 23/24 |

FOREIGN PATENT DOCUMENTS

| CN | 105803044 | 7/2016 |
|---|---|---|
| CN | 106191209 | 10/2019 |
| WO | 8202563 A1 | 8/1982 |

OTHER PUBLICATIONS

International Search Report for PCT International Application No. PCT/IB2020/053156, mailed on Jun. 17, 2020, 5 pages.

* cited by examiner

*Primary Examiner* — Henry H Nguyen
(74) *Attorney, Agent, or Firm* — HYLTON-RODIC LAW PLLC

(57) ABSTRACT

A method. The method includes providing a device, the device comprising: a body member comprising a self-supporting, waterproof substrate having upper and lower surfaces; and a layer of adhesive-coated on the upper surface of the substrate, the adhesive being non-inhibitory to the growth of microorganisms; and a cold-water-soluble powder adhered to the adhesive, the powder comprising: guar gum; one or more nutrients for growing microorganisms; and a cover sheet having an inner-facing surface and an outer-facing surface, the cover sheet adhered to at least a portion of the body member; incubating a sample in the device to form a gel; and counting colonies between 24 hours to 72 hours and/or determining if the gel surrounding a colony is degraded.

13 Claims, 1 Drawing Sheet

METHOD TO DETECT AND ENUMERATE MICROORGANISMS

CROSS REFERENCE TO RELATED APPLICATIONS

This application is a national stage filing under 35 U.S.C. 371 of PCT/IB2020/053156, filed Apr. 2, 2020, which claims the benefit of Provisional Application No. 62/830,058, filed Apr. 5, 2019, the disclosure of which is incorporated by reference in its/their entirety herein.

BACKGROUND

Copious amounts of water are used for hydraulic fracturing of oil and gas bearing rock formations. A great deal of time energy, and money goes into treating and modifying this water with various chemistries to optimize the physical and chemical properties for this application. This includes friction reducers, corrosion inhibitors, viscosity modifiers (commonly guar gum or modified guar gum), and biocides. After the water is treated, proppant (e.g. sand) is added as a material strong enough to prop open the fractured rock fissures. Sand based proppant used in hydraulic fracturing of rock is typically a mined quartz sand that has rounded grains and is durable and crush-resistant. Sand used in the hydraulic fracturing of rock is sometimes referred to a 'frac sand' or 'fracking sand'. As a mined material, the sand used can have a diverse profile. The microorganism content of the sand can vary depending on multiple factors including the mining site environment and mining techniques. Some mined sands can contain microorganisms that degrade guar gum. Oil and gas service companies are beginning to appreciate the potential harm of guar gum degrading microorganisms to hydraulic fracturing operations."

Media and method for culturing and detecting microorganisms are generally prepared by dispersing a solidifying agent in an aqueous solution containing nutrients and other ingredients necessary for the growth of specific microorganisms. Conventional solidifying agents, such as agar, are often inconvenient for the end user. There is a need for a better method to detect and enumerate microorganisms.

SUMMARY

In one aspect, the present disclosure provides a method, comprising providing a device, the device comprising: a body member comprising a self-supporting, waterproof substrate having upper and lower surfaces; and a layer of adhesive-coated on the upper surface of the substrate, the adhesive being non-inhibitory to the growth of microorganisms; and a cold-water-soluble powder adhered to the adhesive, the powder comprising: guar gum; one or more nutrients for growing microorganisms; and a cover sheet having an inner-facing surface and an outer-facing surface, the cover sheet adhered to at least a portion of the body member; incubating a sample in the device to form a gel; and counting colonies between 24 hours to 72 hours and/or determining if the gel surrounding a colony is degraded.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

Definitions

For the following defined terms, these definitions shall be applied for the entire Specification, including the claims, unless a different definition is provided in the claims or elsewhere in the Specification based upon a specific reference to a modification of a term used in the following definitions:

The terms 'culture device' and 'microorganism culture device' are meant to be used interchangeably in the disclosure.

The terms "about" or "approximately" with reference to a numerical value or a shape means +/− five percent of the numerical value or property or characteristic, but also expressly includes any narrow range within the +/− five percent of the numerical value or property or characteristic as well as the exact numerical value. For example, a temperature of "about" 100° C. refers to a temperature from 95° C. to 105° C., but also expressly includes any narrower range of temperature or even a single temperature within that range, including, for example, a temperature of exactly 100° C. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The terms "a", "an", and "the" include plural referents unless the content clearly dictates otherwise. Thus, for example, reference to a material containing "a compound" includes a mixture of two or more compounds.

BRIEF DESCRIPTION OF THE DRAWINGS

The disclosure may be more completely understood in consideration of the following detailed description of various embodiments of the disclosure in connection with the accompanying figures, in which.

Figure 1:
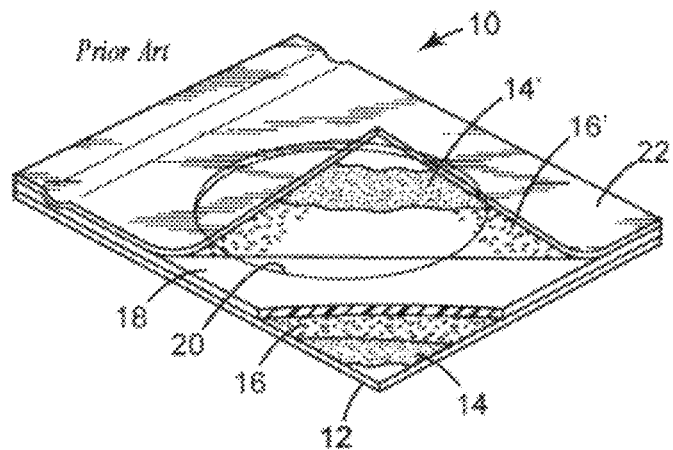
FIG. 1 is a top perspective view, partially in section, of a preferred microbiological growing device.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The present disclosure provides a method for detecting and/or enumerating microorganisms. The method includes providing a device. Devices included in the method of the disclosure are commonly referred to as thin film culture devices. Thin film culture devices used in the method of the disclosure include devices disclosed in U.S. Pat. Nos. 4,565,783 and 5,089,413, which are incorporated herein by reference in their entirety. A thin film device that can be used in the method of the disclosure is a PETRIFILM Aerobic Count Plate from the 3M Corporation (St. Paul, MN).

Figure 4:
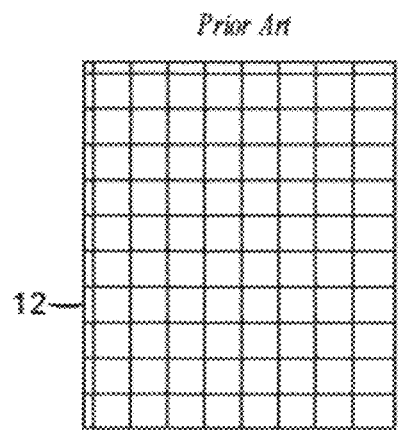
FIG. 4 is a top view of the device of FIG. 2 showing a grid pattern printed on the substrate.

The device 10 includes a body member comprising a self-supporting water-proof substrate 12 having upper and lower surfaces. Substrate 12 is preferably a relatively stiff film of a material such as polyester, polypropylene or polystyrene which will not absorb or otherwise be affected by water. Polyester films approximately 0.1 mm to 0.18 mm thick, polypropylene films approximately 0.1 mm to 0.2 mm thick and polystyrene films approximately 0.38 mm thick have been found to work well. Other suitable substrates include photoprint paper with a polyethylene or other waterproof coating, as described in U.S. Pat. No. 4,565,783. The substrate 12 may be either transparent or opaque, depending on whether one wishes to view bacterial colonies through the substrate. To facilitate the counting of bacterial colonies, the substrate 12 may have a pattern (e.g., a square grid pattern) printed thereon as shown in FIG. 4.

Substrate 12 is coated on its upper surface with a layer of an adhesive 14 which serves to hold a cold-water-soluble powder 16 on the substrate in a uniform monolayer for easy hydration. Adhesive 14 preferably is water-insoluble and non-inhibitory to the growth of microorganisms. Preferably, the adhesive is sufficiently transparent when wet to enable the viewing of bacterial colonies through the film coated with the adhesive. Suitable adhesives for use in adhesive 14 include, for example, pressure-sensitive adhesives. However, heat-activated adhesives wherein a lower melting substance is coated onto a higher melting substance may also be used. Water-activated adhesives such as mucilage may also be useful.

Adhesive 14 should be coated onto substrate 12 in a thickness which is preferably less than the diameter of the particles of the powdered gelling agent and/or nutrients. In any embodiment, it may be preferable to apply enough adhesive to adhere the particles to the substrate but not so much that the particles become completely embedded in the adhesive. A uniform monolayer of powder 16 is desired to ensure uniformity of the rehydrated culture media. The dry powder coating should have sufficient surface area exposed in a microbial growth zone for hydration during use. Generally, an adhesive layer in the thickness range of about 5 μm to about 13 μm is suitable.

The microbial growth zone is the region in the device into which the sample (inoculum) is placed during inoculation of the device. Typically, the microbial growth zone is spaced apart from the edges of the substrate 12 and the cover sheet (described herein) in order to prevent contamination of the sample and/or prevent leakage of the sample out of the device. After an aqueous liquid (e.g., containing the sample to be tested) is placed into the microbial growth zone, the cold-water-soluble powder and the dry composition are contacted by the liquid. The microbial growth zone is free of matrixes that prevent visualization of bacterial colonies.

A non-limiting example of an adhesive suitable for use in a device of the present disclosure is a copolymer of isooctylacrylate/acrylamide (in a mole ratio of 94/6). Other pressure sensitive adhesives which may be used include isooctylacrylate/acrylic acid (in a mole ratio of 95/5 or 94/6) and silicone rubber. Adhesives which turn milky upon exposure to water are less preferred, but may be used in conjunction with a nontransparent substrate or where colony visualization is not required.

A monolayer of cold-water-soluble powder 16 is adhered uniformly to adhesive layer 14. Powder 16 comprises at least one ingredient selected from the group consisting of a cold-water-soluble gelling agent one or more nutrients for growing microorganisms, and a mixture of a cold-water-soluble gelling agent and one or more nutrients for growing microorganisms. As used in the specification and claims, the term "powder" designates a finely divided particulate material having an average diameter of less than 400 micrometers. As used in the specification and claims, the term "cold-water-soluble" designates material which forms a solution in water at room temperature.

The "cold-water-solubility" of the powders employed in the devices of the present invention may result, for example, from the inclusion in these powders of an appropriate gelling agent. Suitable gelling agents for inclusion in powder 16 include natural gelling agents which form solutions in water at room temperature. Gelling agents such as locust bean gum and agar form solutions in water and are suitable gelling agents for providing powders which are "cold-water-soluble." In some embodiments, the powder can include guar gum.

In any embodiment, the cold-water-soluble powder can comprise powdered nutrients and powdered cold-water-soluble gelling agent(s) that are present in a ratio of about 3 parts nutrients:1 part cold-water-soluble gelling agent(s).

As indicated, cold-water-soluble powder 16 may comprise only a gelling agent. Where the device, as manufactured, contains a powder comprising only gelling agent, the end user adds his own special nutrients "tailored" to the type of microorganisms he wishes to grow. For example, dry powdered nutrients may be suspended in a rapidly evaporating liquid as ethanol or "Freon". In other instances, dry powdered nutrients may be suspended or dissolved in aqueous solutions. An aliquot of the liquid is added to the surface of substrate 12 which has been coated previously with adhesive and gelling agent. The liquid is allowed to evaporate, leaving ample nutrients along with the gelling agent. In other instances, the dry powdered nutrient(s) may be suspended or dissolved in an aqueous liquid that is used to hydrate the dry powder. In these instances, the liquid is not evaporated before use. The sample may be mixed with the aqueous liquid before or shortly after the dry powder is hydrated with the aqueous liquid. Alternatively, the sample may be applied to the hydrated dry powder after the gelling agent has been hydrated and allowed to form a hydrogel.

Where gelling agent is included in powder 16, a sufficient amount of the gelling agent is adhered to the substrate so that a predetermined quantity of water or an aqueous sample, e.g., 1-3 milliliters, placed on the substrate will form a gel having a viscosity of about 1500 cps or more when measured at 60 rpm with a Brookfield Model LVF viscometer at 25° C. Gels of this viscosity will allow convenient handling and stacking and provide distinct colony identification. In most cases 0.025 to 0.050 gram of guar gum on a surface area of about 20 cm$^2$ will provide a sufficiently viscous gel when hydrated with 1-3 milliliters of an aqueous sample. The size of the powder particles can be used to control the coating weight per unit area. For example, approximately 100 mesh guar gum coats to a weight of about 0.05 grams/5 cm diameter disc; and a 400 mesh guar gum coats to a weight of about 0.025 grams/5 cm diameter disc. If additional amounts of gelling agent and/or nutrients are required, the optional cover sheet of this embodiment may also be coated.

It may be desirable to incorporate a dye into the powder. Alternatively, the dye may be incorporated in adhesive 14. Suitable dyes are those which are metabolized by the growing microorganisms, and which cause the colonies, the microorganisms and/or the surrounding gel to be colored or fluorescent for easier visualization. Examples of such dyes include triphenyl tetrazolium chloride, p-tolyl tetrazolium red, tetrazolium violet, veratryl tetrazolium blue and related dyes. Other suitable dyes are those sensitive to pH changes (e.g., neutral red, carboxyphenol red), chromogenic enzyme substrates, and fluorogenic enzyme substrates. In some embodiments, the dye is selected from the group consisting of triphenyltetrazolium chloride, p-tolyltetrazolium red, tetrazolium violet and veratryltetrazoleum blue.

In the device of FIG. 1, the body member includes a spacer element applied to the upper surface of substrate 12, the spacer element comprising a piece of spacer 18 having a circular aperture 20 cut through the center to expose the powder 16 on substrate 12. The walls of aperture 20 provide a well of predetermined size and shape to confine the medium following hydration or retain a predetermined amount of liquid in contact with the substrate. Spacer 18 should be thick enough to form a well of the desired volume, e.g., 1, 2 or 3 milliliter. Closed cell polyethylene foam is preferred material for spacer 18, but any material which is hydrophobic (non-wetting), inert to microorganisms, and capable of withstanding sterilization may be used. In these embodiments, the aperture 20 typically forms a perimeter of the microbial growth zone in the culture device.

Adhered to one edge of spacer 18 of the body member is a cover sheet 22. Cover sheet 22 is preferably transparent to facilitate counting of the bacterial colonies and is substantially impermeable to bacteria and water vapor. As used in the specification and claims, "substantially impermeable to bacteria and moisture vapor" designates cover sheets which prevent undesired contamination of the dehydrated medium during shipping, storage and use of the devices and which provide an environment which will support the growth of microorganisms during the incubation period. Generally, it will have the same properties as substrate 12, but need not be as stiff. Cover sheet 22 can be selected to provide the amount of oxygen transmission necessary for the type of microorganism desired to be grown. For example, polyester films have a low oxygen permeability (less than 5 g/645 cm$^2$/24 hours per 0.025 mm of thickness) and would be suitable for growing anaerobic bacteria. On the other hand, polyethylene has a very high oxygen permeability (approximately 500 g/645 cm$^2$/24 hours per 0.025 mm of thickness) and would be suitable for aerobic organisms. The presently preferred material for cover sheet 22 is a 1.6 mil biaxially-oriented polypropylene film. Cover sheet 22, as illustrated, is coated with optional layers of adhesive 14' and powder 16'. It is to be understood that cover sheet 22 may alternatively be adhered to substrate 12 of the body member and that it may be free of any coating or may be coated with a layer of pressure-sensitive adhesive only.

Figure 2:
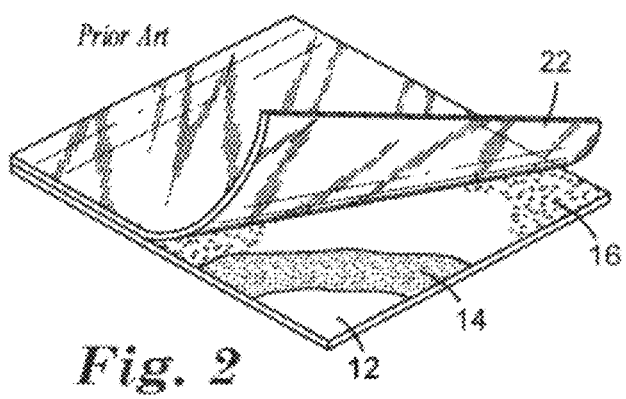
FIG. 2 is a top perspective view of an alternative embodiment of of a microbiological growing device.
Figure 3:
FIG. 3 is a cross sectional view of device of FIG. 1.

The embodiment of FIG. 2 is identical to that of FIG. 1 except that spacer 18 is not present. A template, such as a weighted circular ring, may be applied temporarily to the outside of cover sheet 22, after closing, to confine the gel to a specific region (i.e., the microbial growth zone of the culture device). Although both of the embodiments illustrated in the drawing have a cover sheet 22 attached to the device, it is also contemplated within the scope of the invention that the powder-containing embodiments may be uncovered and simply placed in a sterile environment during storage and incubation.

Another device (not illustrated) in accordance with the present invention comprises a bottom member comprising a self-supporting, water-proof substrate having upper and lower surfaces. Coated on at least a portion of the upper surfaces of the substrate is a coating which is substantially water-free and which consists essentially of a cold-water-reconstitutable material comprising at least one ingredient selected from the group consisting of a cold-water-soluble gelling agent, one or more nutrients for growing microorganisms, and a mixture of a cold-water-soluble gelling agent and one or more nutrients for growing microorganisms. As used in the specification and claims, the phrase "substantially water-free" designates a coating which has a water content no greater than about the water content of the dehydrated coating once it has been permitted to equilibrate with the ambient environment. Suitable substrates for employment as the body member in this embodiment include those discussed above in connection with the illustrated embodiments.

This embodiment also comprises a cover sheet releasably adhered to at least a portion of the bottom member, the cover sheet being substantially impermeable to bacteria and water vapor. The cover sheet may be coated with dry composition that may include a gelling agent and/or nutrient mixture in the form of, for example, the above-described cold-water-soluble powder adhered to the cover sheet by means of an adhesive layer or a coating such as that which is coated on the substrate of the body member in this embodiment. Alternatively, the cover sheet may also be coated with only a pressure-sensitive adhesive or may be free of any type of coating. Suitable materials for the cover sheet include those discussed above in connection with the illustrated embodiments.

In any embodiment of a device according to the present disclosure, the dry composition adhered to the cover sheet may comprise a second cold-water-soluble gelling agent (e.g., guar gum).

The material employed in the coating of this embodiment is cold-water-reconstitutable. As used in the specification and claims, "cold-water-reconstitutable" designates material which forms a solution, sol or gel in water at room temperature. Suitable gelling agents for inclusion in the coating of this embodiment (if such are contained in the coating) include the above-described gelling agents which form solutions in water at room temperatures. In addition, it has been found that agar, after it has been dissolved in boiling water and deposited as a coating, is a material which is "cold-water-reconstitutable".

In any embodiment of the method, after the growth zone is contacted (e.g., inoculated) with a sample (inoculum) and closed, the sample in the device is incubated for a period of time (e.g., a predetermined period of time). The incubation conditions (e.g., the incubation temperature) can affect the rate of growth of the microaerotolerant, microaerophilic, facultatively-anaerobic, or obligately-anaerobic bacteria and may affect the types of bacteria that are detected, as is well known by a person having ordinary skill in the art. For example, incubation at lower temperatures (e.g., about 25° C.) can allow for the detection of psychrotrophic bacteria). In some embodiments, a predefined amount of sample or inoculum is prepared and contacted with the growth zone (e.g. 1-3 mL or 1-50 mg). Typically, the predefined amount is about 1 mL, although the amount can be varied with the size of the growth zone used in the device.

Incubation at higher temperatures (e.g., about 30° C., about 32° C., about 35° C., about 37° C.) may facilitate faster growth of certain microaerotolerant, microaerophilic, facultatively-anaerobic, or obligately-anaerobic microorganisms.

In some embodiments, the culture device can be incubated for at least about 16 hours, at least about 18 hours, at least about 24 hours, or at least about 48 hours. In some embodiments, the culture device can be incubated not more than about 24 hours, not more than about 48 hours, or not more than about 72 hours. In certain preferred embodiments, the culture device is incubated about 24 hours to about 48 hours. In any embodiment, the culture device can be incubated, and maintain a reduced-oxygen environment therein, for about 72 hours, for about 96 hours, for about 120 hours, for about 7 days, or for about 8 days before detecting or counting anaerobic microorganism colonies growing in the growth region. In any embodiment, incubating the culture device for a period of time sufficient to permit formation of a microbial colony comprises incubating the culture device for the period of time in an aerobic gaseous environment. In some embodiments, the sample in the device can be incubated for 24 hours to 72 hours to form a gel.

After the sample in the device is incubated, the method may further comprise detecting a microbial colony. Microbial colonies can be detected in the culture device by a variety of techniques that are known in the art. In some embodiments, after a suitable incubation period, colonies can be visualized by the presence of a dye. Suitable dyes include those that are metabolized by or otherwise react with the growing microorganisms, and in so doing cause the colonies to be colored or fluorescent for easier visualization. Such dyes include triphenyl tetrazolium chloride, p-tolyl tetrazolium red, tetrazolium violet, veratryl tetrazolium blue and related dyes, and 5-bromo-4-chloroindolyl phosphate disodium salt. Other suitable dyes include those sensitive to pH changes during the growth of microorganisms, such as neutral red. The absence of colored colonies indicates the absence of microorganisms in the sample capable of metabolizing or otherwise interacting with the chosen dye.

A degraded gel surrounding a colony of microorganisms can be detected visually and/or by the use of an imaging system. In some embodiments, degraded gel, if present surrounding a colony of microorganisms, can be detected by determining if there is a movement of water by pressing the cover sheet. Microorganisms capable of enzymatically hydrolyzing guar gum result in a degraded gel surrounding a colony of the microorganisms and may result in free water accumulation. The cover sheet can be pressed using a finger to apply pressure or a small probe device such as a dowel can be used. The probe can have any suitable shape. A common useful shape is that of a circular dowel with either a flat or rounded tip.

Upon pressing the outer-facing surface of the cover sheet (i.e. pressing the surface of the cover sheet facing away from the substrate) in the vicinity of a colony, water movement from degraded gel can be visually observed in the growth zone of the device. Evidence of water movement indicates a degraded gel and further indicates that the sample or inoculum contains a microorganism that degrades guar gum.

In some embodiments, after the sample in the device is incubated, the method may comprise enumerating a total microbial count of the sample by counting up the colonies.

In any embodiment the sample or inoculum that is used to inoculate the culture device is prepared from a proppant material such as sand. In some embodiments the sample or inoculum that is used to inoculate the culture device is a suspension of proppant particles (such as sand particles) suspended in an aqueous medium. In some embodiments the aqueous medium is phosphate buffered water (e.g. Butterfield's buffer). In some embodiments, the sample or inoculum that is used to inoculate the culture device is prepared by washing proppant particles (such as sand particles) with an aqueous liquid, separating the proppant particles from the aqueous liquid, and then using a portion of the aqueous liquid from the washing procedure as the sample or inoculum. In some embodiments, the aqueous wash liquid used as the sample or inoculum is substantially free of proppant particles.

In some embodiments, the sample or inoculum can be added to the device in a two step procedure of first adding proppant material to the growth zone and then adding an aqueous liquid. In some embodiments, the order of addition of proppant material and aqueous liquid can be reversed.

The method is particularly useful to detect microorganisms capable of degrading guar gum in the sample, for example, sand used for hydraulic fracturing in the oil and gas operations. Additionally, the method can also be used to quantify the total number of aerobic microorganisms present on the sample, for example, sand.

The following embodiments are intended to be illustrative of the present disclosure and not limiting.

EMBODIMENTS

The following working examples are intended to be illustrative of the present disclosure and not limiting.

Embodiment A is a method, comprising providing a device, the device comprising:
  a body member comprising a self-supporting, waterproof substrate having upper and lower surfaces; and
  a layer of adhesive-coated on the upper surface of the substrate, the adhesive being non-inhibitory to the growth of microorganisms; and a cold-water-soluble powder adhered to the adhesive, the powder comprising: guar gum; one or more nutrients for growing microorganisms; and a cover sheet having an inner-facing surface and an outer-facing surface, the cover sheet adhered to at least a portion of the body member; incubating a sample in the device to form a gel; and counting colonies between 24 hours to 72 hours and determining if the gel surrounding a colony is degraded.

Embodiment B is the method of Embodiment A, wherein determining if the gel surrounding a colony is degraded comprises determining if there is a movement of water by pressing the cover sheet.

Embodiment C is the method of Embodiment A or Embodiment B, wherein the cover sheet comprises a transparent film.

Embodiment D is the method of Embodiment C, wherein the film is selected from the group consisting of polyester, polyethylene, polypropylene, polystyrene and silicone.

Embodiment E is the method of any one of the Embodiments A-D, wherein the device further comprises a hydrophobic spacer element adhered to the upper surface of the substrate forming side walls to retain a predetermined amount of liquid in contact with the substrate.

Embodiment F is the method of Embodiment E, wherein the spacer element comprises a hydrophobic foam sheet having a hole therein.

Embodiment G is the method of Embodiment F, wherein the foam is polystyrene.

Embodiment H is the method of any one of the Embodiments A-G, wherein the substrate is a film selected from the group consisting of polyester, polypropylene, polyethylene and polystyrene.

Embodiment I is the method of any one of the Embodiments A-H, wherein the substrate has a grid pattern printed thereon.

Embodiment J is the method of any one of the Embodiments A-I, wherein the adhesive is a pressure-sensitive adhesive.

Embodiment K is the method of any one of the Embodiments A-J, wherein the adhesive is substantially transparent when wetted with water.

Embodiment L is the method of any one of the Embodiments A-K, wherein the adhesive is a copolymer of isooctyl acrylate and acrylamide in a mole ratio of 94:6, respectively.

Embodiment M is the method of any one of the Embodiments A-L, wherein one of the powder and the adhesive contains a dye which is metabolizable by microorganisms and which causes the microorganisms and/or the surrounding gel to be colored or fluorescent.

Embodiment N is the method of any one of the Embodiments A-M, wherein the dye is selected from the group consisting of triphenyltetrazolium chloride, p-tolyltetrazolium red, tetrazolium violet and veratryltetrazoleum blue.

Embodiment O is the method of any one of the Embodiments A-N, wherein the method comprises detecting guar gum degrading microorganisms in a sample of proppant material.

Embodiment P is the method of Embodiment O, wherein the proppant material comprises sand.

Embodiment Q is the method of any one of the Embodiments A-P, wherein the device is a microorganism culture device.

Embodiment R is the method of any one of the Embodiments A-Q, wherein the sample is incubated at about 30-35° C.

Embodiment 5 is the method of any one of the Embodiments B-R, wherein the cover sheet is pressed using a finger or a probe device.

Embodiment T is the method of any one of the Embodiments A-S, wherein the method further comprises inoculating the device with a sample.

Embodiment U is the method of any one of the Embodiment T, wherein the sample is prepared from a proppant material.

Embodiment V is the method of Embodiment T, wherein the sample is an aqueous sample.

Embodiment W is the method of Embodiment T or Embodiment U, wherein the sample comprises a suspension of proppant particles.

Embodiment X is the method of Embodiment T or Embodiment U, wherein the sample comprises a suspension of sand particles.

Embodiment Y is the method of Embodiment T or Embodiment U, wherein the sample is prepared by washing proppant particles with an aqueous liquid and using a portion of the liquid from the wash procedure as the sample.

Embodiment Z is the method of Embodiment T or Embodiment U, wherein the sample is prepared by washing sand particles with an aqueous liquid and using a portion of the liquid from the wash procedure as the sample.

Embodiment AA is the method of any one of the Embodiments B-Z, wherein the cover sheet is pressed in the vicinity of a colony.

Embodiment AB is the method of any one of the Embodiments B-AA, wherein if the movement of water by pressing the cover sheet is detected, then the gel is determined to be degraded.

Embodiment AC is the method of any one of the Embodiments B-AA, wherein if the movement of water by pressing the cover sheet is detected, then the presence of a guar degrading microorganism is indicated.

Embodiment AD is the method of Embodiment AC, wherein if the presence of a guar containing microorganism is indicated, then the proppant material is designated not to be used as a proppant in the hydraulic fracturing of rock formations.

Embodiment AE is the method of Embodiment AC, wherein if the presence of a guar containing microorganism is indicated, then the proppant material is designated not to be used as a proppant to open fissures in rocks.

Embodiment AF is the method of Embodiment A-AB, wherein if the gel surrounding a colony is degraded, then the proppant material is designated not to be used as a proppant in the hydraulic fracturing of rock formations.

Embodiment AG is the method of any of the Embodiments A-AA, wherein if the gel surrounding a colony is not degraded, then the proppant material is designated to be used as a proppant to open fissures in rocks.

Embodiment AH is a method of detecting a guar gum degrading microorganism in a sample, the method comprising:
preparing an an aqueous inoculum from a proppant material;
inoculating a thin film culture device comprising nutritional media and guar gum with the inoculum to form a gel;
incubating the culture device for 24 to 72 hours at a temperature suitable for the growth of a microorganism;
and determining if the gel surrounding a colony is degraded.

Embodiment AI is the method of Embodiment AH, wherein the nutritional media can support the growth of microorganisms.

Embodiment AJ is a method of detecting a guar gum degrading microorganism in a sample, the method comprising:
preparing an an aqueous inoculum from a proppant material;
contacting a predefined volume of the inoculum with a growth zone of a thin film culture device to form a gel, the device comprising:
a body member comprising a self-supporting, water-proof substrate having upper and lower surfaces;
a dry, cold-water-reconstitutable material fixed to and covering at least a portion of the upper surface of the substrate, the material comprising guar gum and a mixture of nutrients to support the growth of a microorganism;
a cover sheet having an inner-facing surface and an outer-facing surface, the cover sheet adhered to at least a portion of the body member;
after contacting the predefined amount of inoculum with the growth zone, incubating the thin film culture device for a period of time and a temperature suitable for growth of a microorganism;
determining if the gel surrounding a colony is degraded.

Embodiment AK is the method of Embodiment AJ, wherein the device further comprises a layer of adhesive disposed on the upper surface of the substrate and wherein the dry, cold-water-reconstitutable material is a powder adhered to the adhesive.

Embodiment AL is the method of Embodiment AJ, wherein the reconstitable material optionally includes an indicator dye.

Embodiment AM is the method of Embodiment AL, wherein the indicator dye is triphenyltetrazolium chloride.

Embodiment AN is the method of Embodiments AJ-AM, wherein the cover sheet is adhered to the body member so that the upper surface of the substrate faces the inner-facing surface of the cover sheet.

Embodiment AO is the method of any one of the Embodiments AJ-AN, wherein the device includes a microbial growth zone disposed between the substrate and the cover sheet.

Embodiment AP is the method of any one of the Embodiments AJ-AO, wherein at least a portion of the cover sheet is transparent.

Embodiment AQ is the method of any one of the Embodiments AH-AP, wherein the proppant material comprises sand.

Embodiment AR is the method of any one of the Embodiments AH-AQ, wherein the inoculum comprises a suspension of proppant material.

Embodiment AS is the method of any one of the Embodiments AH-AQ, wherein the inoculum is prepared by washing a sample of proppant material with an aqueous liquid and using a portion of the liquid from the wash procedure as the inoculum.

Embodiment AT is the method of any one of the Embodiments AH-AS, wherein the culture device is incubated at about about 30-35° C.

Embodiment AU is the method of any of the embodiments AH-AT, wherein the number of colonies on the plate are optionally counted.

Embodiment AV is the method of any one of the Embodiments AH-AU, wherein the step of incubating the culture device takes place before the step of determining if the gel surrounding a colony is degraded.

Embodiment AW is the method of Embodiment AU or AV, wherein the step of incubating the culture device takes place before the step of optionally counting the number of colonies on the culture plate.

Embodiment AX is the method of any one of the Embodiments AH-AW, wherein determining if the gel surrounding a colony is degraded comprises determining if there is a movement of water by pressing the cover sheet.

Embodiment AY is the method Embodiment AX, wherein the cover sheet is pressed in the vicinity of a colony.

Embodiment AZ is the method of Embodiment AX or Embodiment AY, wherein the cover sheet is pressed using a finger or probe device.

Embodiment BA is the method of any one of the Embodiments AX-AZ, wherein if the movement of water by pressing the cover sheet is detected, then the gel is determined to be degraded.

Embodiment BB is the method Embodiments BA, wherein if the movement of water by pressing the cover sheet is detected, then the presence of a guar degrading microorganism is indicated.

Embodiment BC is the method of Embodiment BB, wherein if the presence of a guar containing microorganism is indicated, then the proppant material is designated not to be used as a proppant to open fissures in rocks.

Embodiment BD is the method of Embodiment BB, wherein if the gel surrounding a colony is degraded, then the proppant material is designated not to be used as a proppant in the hydraulic fracturing of rock formations.

EXAMPLES

Example 1

The sample for inoculation of a device was prepared by vortex mixing a conical vial containing sand (2.4 g, median diameter of about 165-185 microns) in Butterfield's buffer (12 mL, obtained from the 3M Corporation St. Paul, MN) for 30 seconds. The sand particles were allowed to settle to the bottom of the vial. A portion of the supernatant (1 mL) was added to a PETRIFILM Aerobic Count Plate (obtained from the 3M Corporation) according to the manufacturer's instructions. The count plate was incubated at 30° C. for 72 hours. At the end of the incubation period, red colored colony forming units (cfu) were counted by visual inspection. The cfu per gram of sand count (cfu/g) for the original sample was then calculated by adjusting the colony count from the plate by the amount of sand and buffer in the original sample. The method was repeated with two additional samples of sand. Degradation of the gel surrounding a colony, was determined by pressing the cover sheet in the vicinity of each colony and then visually observing if there was water movement under the cover sheet. The observation of water movement indicated degradation of gel. The results are reported in Table 1 for each of the samples tested.

TABLE 1

| Sample Number | Calculated Colony Count (cfu/g of sand) | Degradation of Gel Surrounding at Least One Colony was Observed |
| --- | --- | --- |
| 1 | 15 | no |
| 2 | 75 | yes |
| 3 | 10 | no |

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A method, comprising
   providing a device, the device comprising:
   a body member comprising a self-supporting, waterproof substrate having upper and lower surfaces; and
   a layer of adhesive coated on the upper surface of the substrate, the adhesive being non-inhibitory to growth of microorganisms; and a cold-water-soluble powder adhered to the adhesive, the powder comprising:
   guar gum;
   one or more nutrients for growing microorganisms; and
   a cover sheet having an inner-facing surface and an outer-facing surface, the cover sheet adhered to at least a portion of the body member;
   incubating a sample in the device to form a gel; and
   counting colonies of said microorganisms said microorganism colonies between 24 hours to 72 hours and determining if the gel surrounding said colonies is degraded by an imaging system or by visual inspection and an imaging system; and
   wherein determining if the gel surrounding said microorganism colony is degraded comprises pressing the coversheet to determine if there is a movement of water.

2. The method of claim 1, wherein the cover sheet comprises a transparent film.

3. The method of claim 2, wherein the transparent film is selected from the group consisting of polyester, polyethylene, polypropylene, polystyrene and silicone.

4. The method of claim 1, wherein the device further comprises a hydrophobic spacer element adhered to the upper surface of the substrate forming side walls to retain a predetermined amount of liquid in contact with the substrate.

5. The method of claim 4, wherein the spacer element comprises a hydrophobic foam sheet having a hole therein.

6. The method of claim 5, wherein the hydrophobic foam sheet is polystyrene.

7. The method of claim 1, wherein the substrate is a film selected from the group consisting of polyester, polypropylene, polyethylene and polystyrene.

8. The method of claim 1, wherein the substrate has a grid pattern printed thereon.

9. The method of claim 1, wherein the adhesive is a pressure-sensitive adhesive.

10. The method of claim 1, wherein the adhesive is substantially transparent when wetted with water.

11. The method of claim 1, wherein the adhesive is a copolymer of isooctyl acrylate and acrylamide in a mole ratio of 94:6, respectively.

12. The method of claim 1, wherein one of the powder and the adhesive contains a dye which is metabolizable by said microorganisms and which causes the microorganisms and/or the gel surrounding the microorganisms to be colored or fluorescent.

13. The method of claim 12, wherein the dye is selected from the group consisting of triphenyltetrazolium chloride, p-tolyltetrazolium red, tetrazolium violet and veratryltetrazoleum blue.

* * * * *